United States Patent [19]
Honda et al.

[11] Patent Number: 5,147,127
[45] Date of Patent: Sep. 15, 1992

[54] LIQUID CRYSTAL DISPLAY APPARATUS

[75] Inventors: Hisashi Honda, Yokohama; Yoji Yuge, Chigasaki, both of Japan

[73] Assignee: Toshiba Lighting & Technology Corporation, Tokyo, Japan

[21] Appl. No.: 645,259

[22] Filed: Jan. 24, 1991

[30] Foreign Application Priority Data

Jan. 25, 1990 [JP] Japan .................................. 2-15730

[51] Int. Cl.$^5$ .............................................. F21V 9/16
[52] U.S. Cl. ........................................ 362/23; 362/84; 362/221; 362/260; 359/50
[58] Field of Search ................. 362/23, 29, 84, 221, 362/222, 260, 265, 263; 350/345; 359/49, 50

[56] References Cited

U.S. PATENT DOCUMENTS

| | | | |
|---|---|---|---|
| 2,317,265 | 4/1943 | Foerste et al. | 362/263 |
| 3,508,103 | 4/1970 | Young | 362/260 |
| 3,890,777 | 6/1975 | Stanish | 362/29 |
| 4,247,928 | 1/1985 | Dorfman | 350/345 |
| 4,541,692 | 9/1985 | Collins et al. | 350/345 |
| 4,649,381 | 3/1987 | Masuda et al. | 350/345 |
| 4,744,012 | 5/1988 | Bergkvist | 362/84 |
| 4,920,298 | 4/1990 | Hinotani et al. | 350/345 |
| 4,958,911 | 9/1990 | Beiswenger et al. | 350/345 |

*Primary Examiner*—Ira S. Lazarus
*Assistant Examiner*—Y. Quach
*Attorney, Agent, or Firm*—Oblon, Spivak, McClelland, Maier & Neustadt

[57] ABSTRACT

A liquid crystal display apparatus comprises a liquid crystal display panel, a fluorescent lamp for illuminating the liquid crystal display panel, the fluorescent lamp being provided with a glass bulb in which at least a pair of electrodes are disposed and mercury and rare gas fill, the glass bulb having an inner surface on which a fluorescent material is applied, the fluorescent lamp being further provided with a pair of receiving terminals, a lighting unit for lighting the fluorescent lamp, the lighting unit being electrically connected to a pair of supply terminals, and a holding unit for holding the liquid crystal display panel detachably, the fluorescent lamp and the lighting unit in an assembled state in which the paired receiving terminals are supported by the paired supply terminals. The liquid crystal display panel, the fluorescent lamp and the lighting unit are integrally assembled with the holding unit with simple assembling process and firmly engaged therewith by the holding members such as holding pawls.

5 Claims, 7 Drawing Sheets

LIQUID CRYSTAL DISPLAY APPARATUS

BACKGROUND OF THE INVENTION

1. Field of the Invention

The present invention relates to a liquid crystal display apparatus to be suitably incorporated in an electronic color view finder of a camera integrated type video system and, more particularly, to a liquid crystal display apparatus in which a small size liquid crystal display panel, an oblate fluorescent lamp and a lighting unit are integrally assembled with a holding unit.

2. Discussion of the Background

There has been proposed a lighting system as a back light for lighting a liquid crystal display panel of a liquid crystal type television set from the rear side thereof, and a typical one example of such conventional lighting system comprises a reflector of substantially semi-circular structure in cross section having an inner surface on which a reflecting film is applied. A linear tubular fluorescent lamp, for example, is disposed inside the reflector and the open end of the reflector is closed by first and second diffuser plates disposed in a laminated manner. A liquid crystal display panel is closely mounted on the laminated diffuser plates.

Namely, according to the lighting system of the structure described above, the direct light from the fluorescent lamp and the indirect light reflected from the reflecting film are planely diffused by the diffuser plates and the luminance on the outer surface of the second, i.e. outer, diffuser plate is made uniform in a plane to thereby constitute a surface light source to illuminate entirely uniformly the rear surface of the liquid crystal display panel.

However, in the conventional lighting system of the structure described above, in order to change the linear light source of the linear tubular fluorescent lamp to the surface light source, many elements or parts such as the reflector and the first and second diffusers are required. For this reason, it is considerably difficult to incorporate such conventional lighting system into an electronic color view finder of a camera integrated type video system as a back light for lighting the rear surface of a small size liquid crystal display panel having a side having a length of about 2 cm in addition to complicated assembling work and less workability.

SUMMARY OF THE INVENTION

An object of the present invention is to substantially eliminate the defects or drawbacks encountered in the prior art and to provide a liquid crystal display apparatus having a thin and compact structure capable of being easily assembled with reduced assembling process steps and with improved workability.

These and other objects can be achieved according to the present invention by providing a liquid crystal display apparatus comprising a liquid crystal display panel, a fluorescent lamp for illuminating the liquid crystal display panel, the fluorescent lamp being provided with a glass bulb in which at least a pair of electrodes are disposed and filled with mercury and gas fill, the glass bulb having an inner surface on which a fluorescent material is applied and the fluorescent lamp being further provided with a pair of receiving terminals, a lighting unit for lighting the fluorescent lamp, the lighting unit being electrically connected to a pair of supply terminals, and a holding unit for holding the liquid crystal display panel, detachably holding the fluorescent lamp and holding the lighting unit in an assembled state in which the paired receiving terminals are supported by the paired supply terminals.

In preferred embodiments, the lighting unit comprises a substrate of a thin rectangular plate-like structure, a lighting circuit element is mounted on one surface of the substrate and a pair of recesses are formed on bilateral edge portions of the one surface of the substrate, the holding unit comprises a holding plate of thin rectangular plate-like structure having a window disposed at substantially a central portion thereof and a bilateral pair of engaging pawl members which are to be engaged with the recesses when the lighting unit is assembled with the holding unit. The engaging pawl members are disposed on one surface of the holding plate at bilateral edge portions of the window, each of the engaging pawl members having an L-shaped structure having a vertical portion projecting from the one surface of the holding plate and a horizontal portion inwardly horizontally extending from a front end of the vertical portion, the horizontal portion having a front end projecting inwardly towards the window.

The fluorescent lamp is provided with a bilateral pair of outward flanged portions on both bilateral edge portions of the glass bulb and the holding unit comprises a substrate of thin rectangular plate-like structure having a window disposed at substantially a central portion of the substrate and a bilateral pair of engaging pawl members which are to be engaged with the flanged portions of the fluorescent lamp when the same is assembled with the holding unit. The engaging pawl members are disposed on one surface of the substrate at bilateral edge portions of the window, each of the engaging pawl members having an L-shaped structure having a vertical portion projecting from the one surface of the holding plate and a horizontal portion inwardly horizontally extending from a front end of the vertical portion, the horizontal portion having a front end projecting inwardly towards the window.

The holding unit is of a bottomed oblate structure having approximately an oblate section in a plan view and comprises a rectangularlly cylindrical portion having a side opening and a pocket-like portion integrally formed with the cylindrical portion so that the liquid crystal display panel is disposed in the rectangularlly cylindrical portion and the fluorescent lamp is disposed in the pocket-like portion when the liquid crystal display panel and the fluorescent lamp are assembled with the holding unit. The rectangularlly cylindrical portion is provided with side edges defining the opening therebetween, the side edges projecting inwardly so as to provide wedge-like shape.

According to the liquid crystal display apparatus of the characters described above, the liquid crystal display panel to be assembled in a camera integrated type video color view finder, for example, the fluorescent lamp for illuminating the display panel from the rear side thereof and the lighting unit are integrally assembeled with the holding unit in a compact manner and with reduced assembling process steps. The positioning of the liquid crystal display panel and the fluorescent lamp are extremely easily performed by utilizing the holding unit.

Furthermore, the receiving terminals and the supply terminal are electrically connected merely by assembling the liquid crystal display panel, the fluorescent lamp and the lighting unit, thus eliminating the wiring for electrically connecting the fluorescent lamp and the lighting unit, thus being improved in the workability thereof.

BRIEF DESCRIPTION OF THE DRAWINGS

For a better understanding of the present invention and to show how the same is carried out, reference is now made, by way of preferred embodiments, to the accompanying drawings, in which.

DESCRIPTION OF THE PREFERRED EMBODIMENTS

FIGS. 1 to 10 represent preferred embodiments according to the present invention, in which like reference numerals are used to designate common elements or parts.

Figure 1:
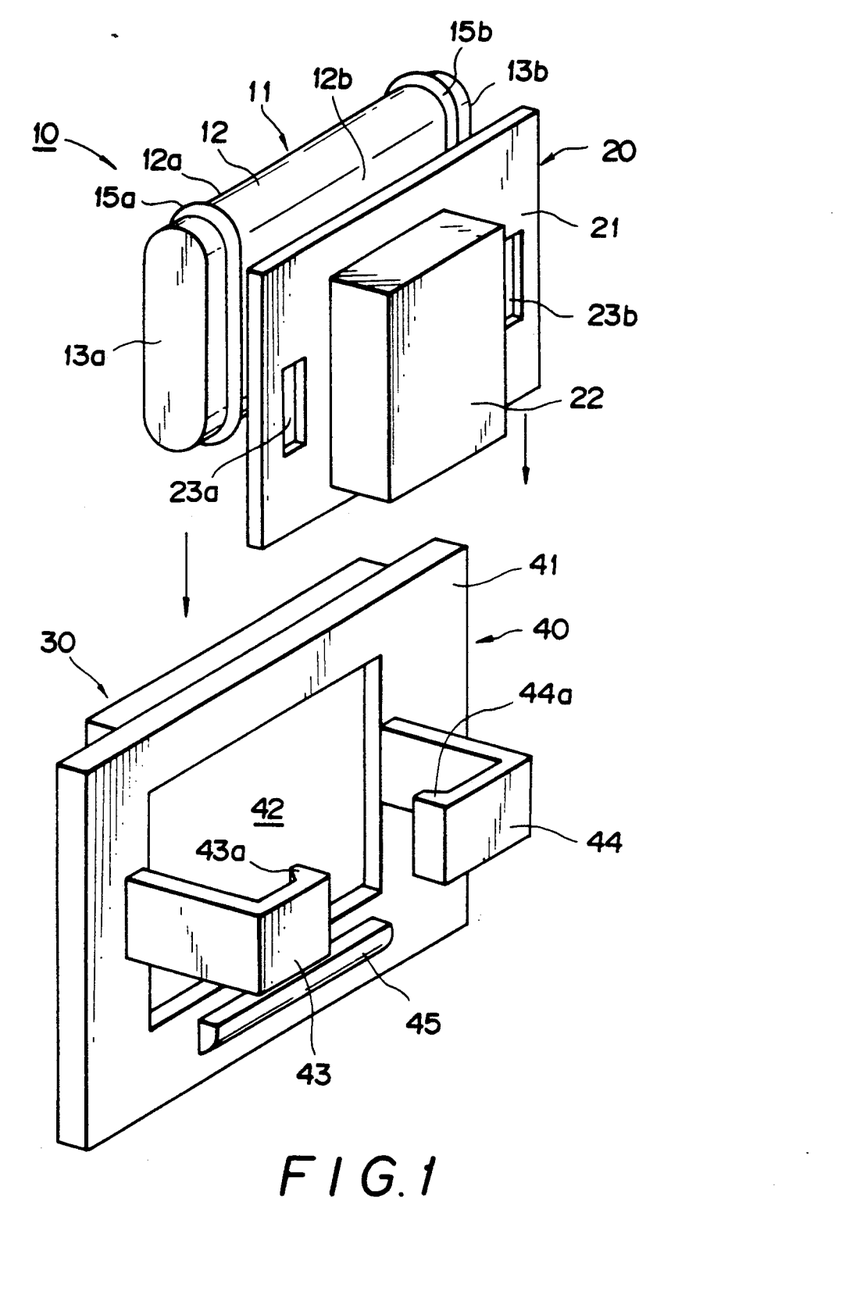
FIG. 1 is an exploded perspective view of a first embodiment of a liquid crystal display apparatus according to the present invention.

Referring to FIG. 1 showing a developed perspective view of a first embodiment of a liquid crystal display apparatus according to the present invention, a liquid crystal display apparatus 10 comprises an oblate fluorescent lamp 11, a lighting unit 20 for lighting the oblate fluorescent lamp 11 and a liquid crystal display panel 30 of small size rectangular structure, which re integrally assembled by means of a holding unit 40.

The oblate fluorescent lamp 11 has, for example, an axial length of about 21 mm and a width (longer diameter) of 18 mm and is provided with a glass bulb 12 having an oblate elongated circular cross section.

Figure 2A:
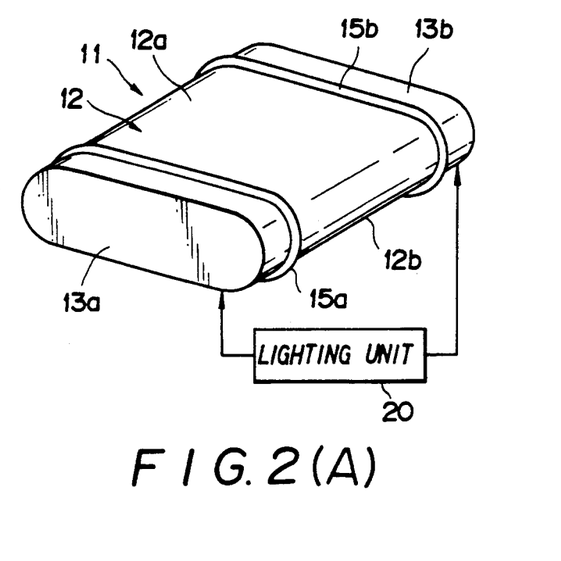
FIG. 2A is a perspective view of an oblate fluorescent lamp assembled with the apparatus shown in FIG. 1.

Referring to FIG. 2A showing a perspective view of the fluorescent lamp 11, a bilateral pair of metal caps 13a and 13b are mounted to the outer peripheries of both the axially opened ends of the oblate cylindrical glass bulb 12 and suitable amounts of mercury and rare gas are enclosed in the interior of the glass bulb 12. The glass bulb 12 has substantially flat upper and lower, as viewed, surfaces 12a and 12b and the whole inner surface is coated with a fluorescent film, the upper surface 12a being formed as a fluorescent surface. Since the fluorscent surface 12a is formed in a plane surface and illuminates substantially entirely with uniform luminance, the diffusing plates, for example, described hereinbefore with reference to the conventional fluorescent lamp can be eliminated in a case where the linear light source is changed to the surface light source.

The bilaterally paired metal caps 13a and 13b are respectively formed into elongated cylindrical shapes with bottoms by a throttling working of an electrically conductive metal plate and the metal caps 13a and 13b are provided with opened ends with which are integrally formed flanged portions 15a and 15b extending outward. The metal caps 13a and 13b are electrically connected to the lighting unit 20, and accordingly, it may be said that the metal caps 13a and 13b may be constituted as electrodes such as cold cathodes and receiving terminals.

According to this construction, a desired voltage is received between the metal caps 13a and 13b, so that the surface discharge is effected between the inner surfaces of the metal caps 13a and 13b in the glass bulb 12.

The lighting unit 20 is, as shown in FIG. 1, constituted as a lighting circuit pattern, not shown, on a substrate 21 in the shape of a rectangular plate and lighting circuit elements 22 is equipped on one surface, front surface as viewed, of the lighting circuit pattern. Vertically elongated recessed portions 23a and 23b for engagement are formed on bilaterally side edge portions, as viewed in FIG. 1, of the substrate 21 of the lighting unit 20.

The holding unit 40 comprises a rectangular thin holding plate 41 provided with a central window 42 having a rectangular shape, and a bilateral pair of engaging pawl members 43 and 44 is disposed on the front surface of the holding plate 41 at bilateral edge portions of the window 42 so as to project outwardly. Each of these engaging pawl members 43 and 44 has an L-shaped section having a projecting vertical portion and an inwardly bent horizontal portion and, accordingly, the horizontal end portions of the pawl members 43 and 44 are opposed to each other. Engaging portions 43a and 44a are provided for the front free ends of the holizontal portions of the L-shaped pawl members 43 and 44 so that the engaging portions 43a and 44a are projected inwardly towards the window 42 so as to be detachably engaged with the paired recessed portions 23a and 23b respectively formed in the substrate 21 of the lighting unit 20, when assembled.

A bottom support projection member 45 is disposed on the front surface of the holding plate 41 at a portion slightly below the lower edge of the window 42 and the bottom support projection member 45 has an elongated rod shape in the illustration of FIG. 1.

Figure 2B:
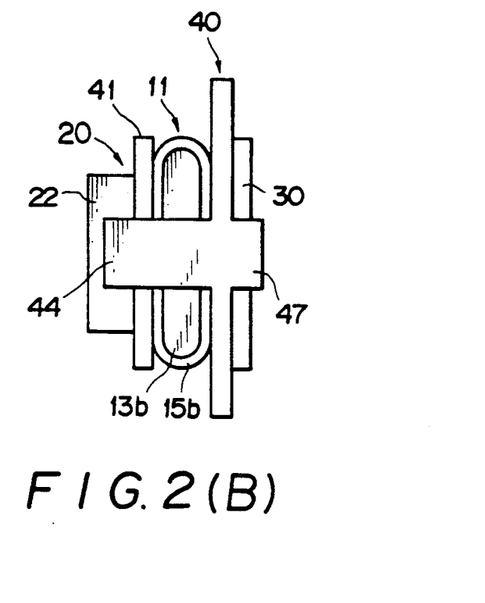
FIG. 2B is a side view of the apparatus of FIG. 1 in an assembled state.
Figure 3:
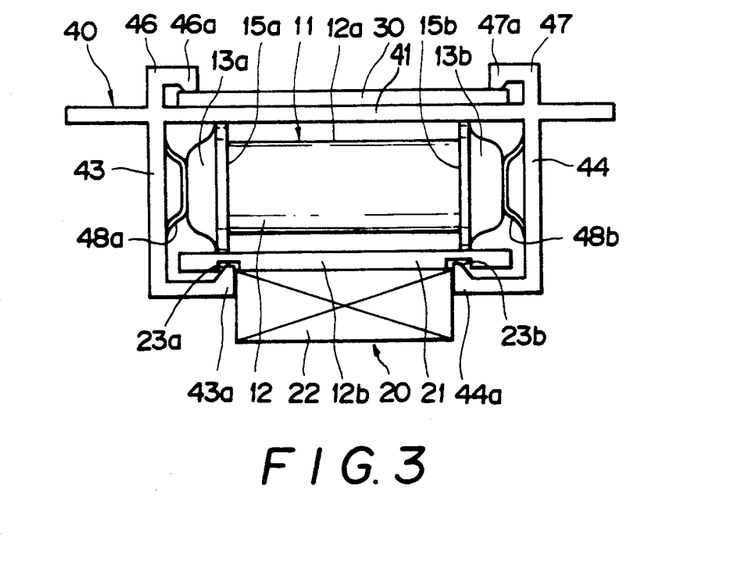
FIG. 3 is a plan view of the apparatus shown in FIG. 1 in an assembled state.

On the rear surface of the holding plate 41 is disposed a liquid crystal display panel 30 in the shape of a thin rectangular plate having a size slightly larger than that of the window 42, and the liquid crystal display panel 30 is detachably mounted to the rear surface of the holding plate 41 by means of a bilateral pair of supporting pawl members 46 and 47, as shown in FIG. 2B and FIG. 3, which are integrally formed with the holding plate 41. Each of the paired supporting pawl members 46 and 47 has an L-shaped section and the front free ends 46a and 47a of the horizontal portions of the respective L-shaped pawl members 46 and 47 are integrally formed as inward projections for inwardly pressing the outer side surfaces of the liquid crystal display panel 30 in the state as shown in FIG. 3.

In case of assembling the oblate fluorescent lamp 11, the lighting unit 20 and the liquid crystal display panel 30 with the holding unit 40, the peripheral surfaces of the paired flanged portions 15a and 15b on the lower side surface 12b, right side surface as viewed in FIG. 1, of the oblate fluorescent lamp 11 abut and then are pressed against the substrate 21 of the lighting unit 20. Then, under this condition, the thus assembled structure is forced into the gap between the paired engaging pawl members 43 and 44 of the holding unit from the upper side thereof, resulting in the detachable engagement of the engaging pawl members 43 and 44 with the recessed portions 23a and 23b of the lighting unit 20, respectively. In this engagement, the bottom of the substrate 21 abuts against the bottom support projection member 45 and is supported thereby in the abutting state. In the described manner, the oblate fluorescent lamp 11 and the lighting unit 20 are forced against the front surface side of the holding plate 41 by means of the paired pawl members 43 and 44 and are supported resiliently.

As shown in FIG. 3, under the aforementioned supported condition of the oblate fluorescent lamp 11 and the lighting unit 20, a bilateral pair of supply terminals 48a and 48b are resiliently close contacted to the outer bottom surfaces of the bilaterally paired metal caps 13a and 13b, acting as electrodes and receiving terminals, of the oblate fluoresent lamp 11, whereby the oblate fluorescent lamp 11 is supported resiliently and detachably in the axial direction thereof and, simultaneously, is made electrically conductive by means of the supply terminals 48a and 48b.

Each of the supply terminals 48a and 48b is composed of an electroconductive thin band plate attached to the inner surface of the vertical portion of the L-shaped engaging pawl member 43 (44) in an inwardly bent manner as shown in FIG. 3 and the supply terminals 48a and 48b are electrically connected to two paired output terminals of the lighting unit 20.

Accordingly, the oblate fluoresecent lamp 11 is resiliently supported in the axial direction thereof by the paired supply terminals 48a and 48b as well as electrically connected to the lighting unit 20.

In the next step, the liquid crystal display panel 30 is inserted into the supporting pawl members 46 and 47 disposed on the rear surface side of the holding unit 40 from the upper side thereof.

According to the liquid crystal display apparatus 10 of the described embodiment, the oblate fluorescent lamp 11, the lighting unit 20 and the liquid crystal display panel 30 are extremely easily assembled with the holding unit 40 in one unitary structure in the detachable manner. In addition, the oblate fluorescent lamp 11 and the lighting unit 20 are electrically connected to the liquid crystal display panel 30 and the positioning of the fluorescent lamp 11 and the liquid crystal display panel 30 can be automatically performed. Accordingly, the thus assembled structure can be easily assembled in a relatively narrow space in a machinanism such as color electronic view finder of a camera integrated type video system only by one process.

Namely, in a case where the oblate fluorescent lamp 11, the lighting uint 20 and the liquid crystal display panel 30 are assembled respectively independently with component machinery, three assembling processes are required. However, according to the present embodiment, the assembling process can be performed only with one simple assembling process, thus improving the workability in the assembling of the display apparatus.

Figure 4:
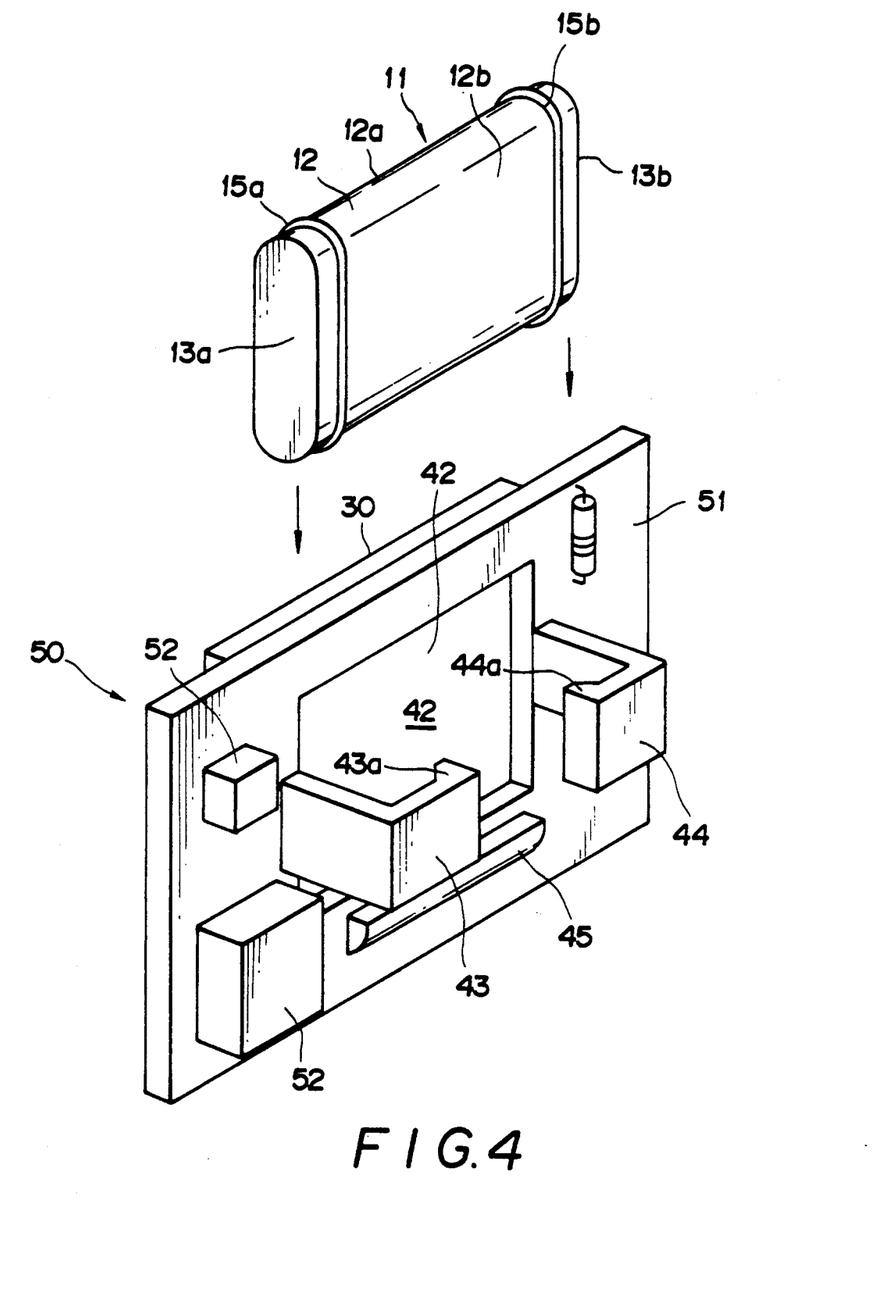
FIG. 4 is an exploded perspective view of a second embodiment according to the present invention.

FIG. 4 is a disassembled perspective view of a second embodiment according to the present invention, in which a holding unit 50 is commonly constructed by the substrate 21 of the lighting unit 20 of the first embodiment, thus eliminating the holding plate 41 in the first embodiment and like reference numerals are added to elements and parts corresponding to those of the first embodiment shown in FIGS. 1 to 3.

Referring to FIG. 4, the holding unit 50 includes lighting circuit parts or elements 52, 52—which are mounted on the front surface, as viewed in FIG. 4, of a substrate 51 having a rectangular plate on which a lighting circuit pattern is formed. The substrate 51 is provided with a window 42 as described with reference to the first emnbodiment of FIG. 1 and a bilateral pair of engaging pawl members 43 and 44 are disposed on the bilateral side edge portions of the window 42. The bottom support portion 45 is also formed on the front surface of the substrate 51 at a portion slightly below the lower edge of the window 42.

Figure 5:
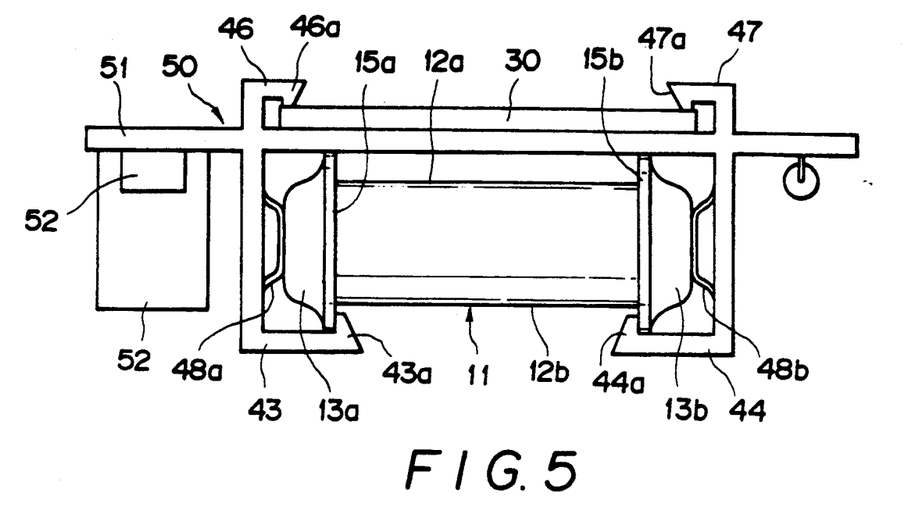
FIG. 5 is a plan view of the apparatus shown in FIG. 4 in an assembled state.

The engaging pawl members 43 and 44 are provided with engaging projections 43a and 44a which are engaged with inner surfaces of flanged portions 15a and 15b of the oblate fluorescent lamp 11 as shown in FIG. 5.

Figure 6:
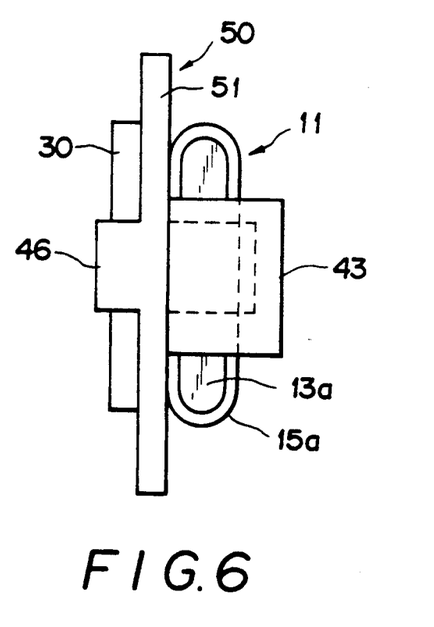
FIG. 6 is a left side view of the apparatus shown in FIG. 4 in an assembled state.

As shown in FIGS. 5 and 6, a bilateral pair of supporting pawl members 46 and 47 are disposed on the back surface of the substrate 51 so as to detachably support the liquid crystal display panel 30. A pair of supply terminals 48a and 48b are provided for the paired engaging pawl members 43 and 44, respectively.

According to the second embodiment, the liquid crystal display apparatus is made further compact and thin in comparison with the first embodiment because the holding substrate 21 in the first embodiment is eliminated.

Figure 7:
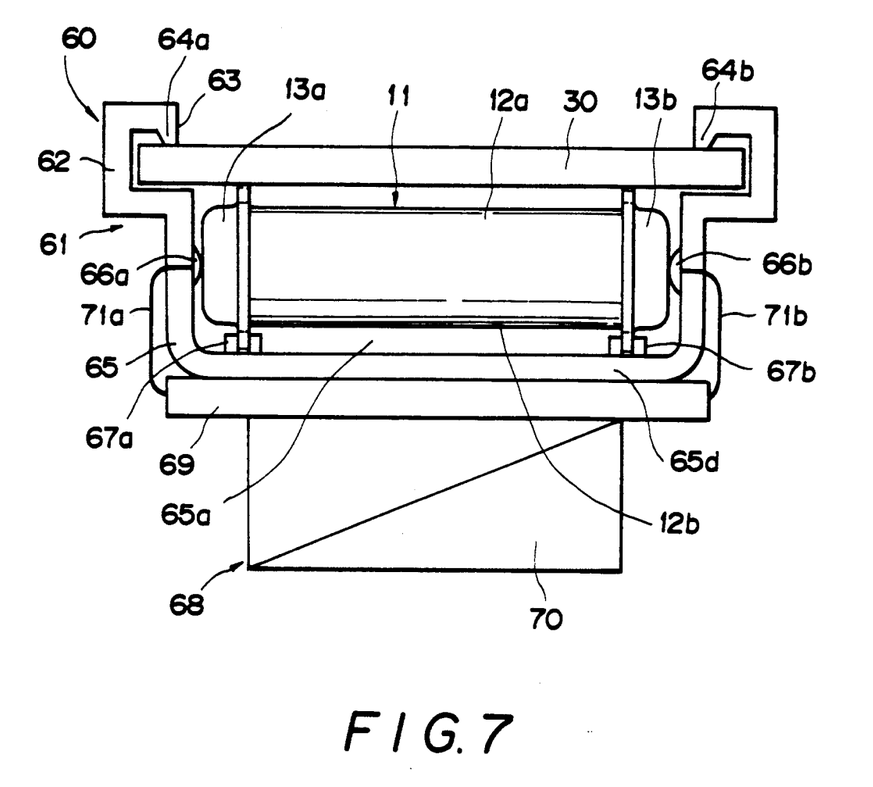
FIG. 7 is a plan view of a third embodiment of the liquid crystal display apparatus in the assembled state according to the present invention.
Figure 8:
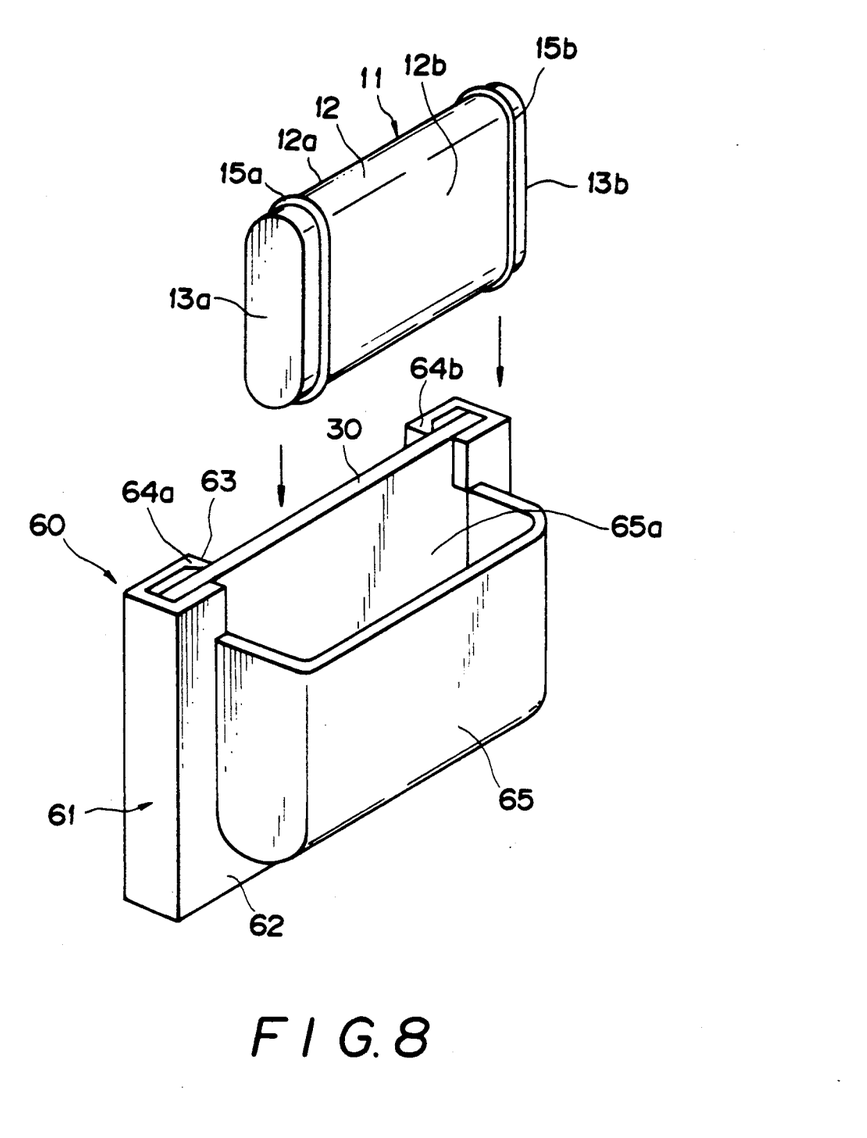
FIG. 8 is a developed perspective view of the third embodiment, partially eliminated, shown in FIG. 7.

FIG. 7 is a plan view of a liquid crystal display apparatus 60 representing a third embodiment according to the present invention which is characterized by a holding unit 61 as shown in FIG. 8.

Referring to FIGS. 7 and 8, the holding unit 61 has an oblate section in a plan view and comprises a bottomed oblate casing 62 having a rectangularly cylindrical portion for the free accommodation of the liquid crystal display panel 30 and the rear side of the casing 62 is opened as an opening 63 with the bilateral side edge portions and the bottom portion being remained so that most part of the front side of the display panel 30 accommodated in the casing 62 of the holding unit 61 is exposed outward of the opening 63, which is defined by the bilateral side edge portions of the rectangularly cylindrical portion of the casing 62. The bilateral edge portions are provided with wedge shaped projection 64a and 64b for supporting the liquid crystal display panel 30 inserted into the side edge portions of the casing 62 as shown in FIG. 7 and 8.

Figure 9:
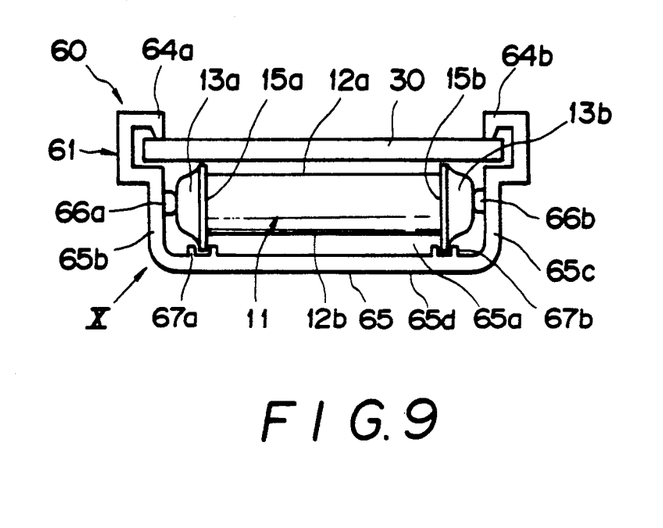
FIG. 9 is a plan view of the apparatus shown in FIG. 8, when assembled.
Figure 10:
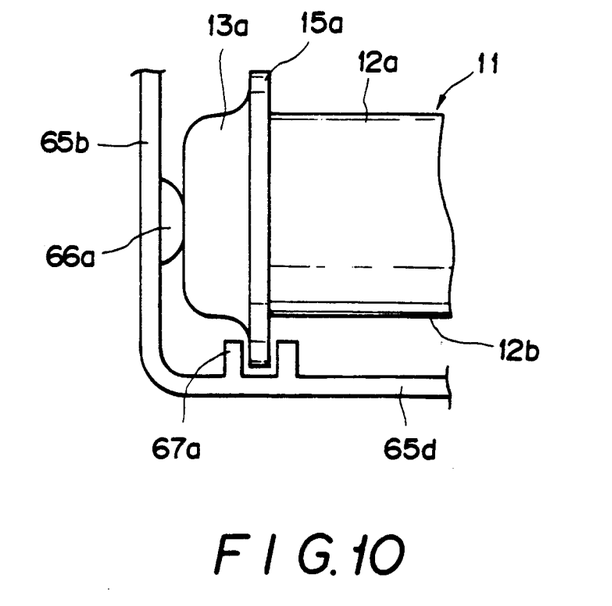
FIG. 10 is an enlarged view of a portion shown by an arrow X in FIG. 9.

The holding casing 62 is further provided with a side pocket 65 having an approximately rectangular shape in section projecting frontward from the front surface of the casing 62, as viewed in the illustration. The side pocket 65 is provided with an upper opening 65a through which the oblate fluorescent lamp 11 is freely accommodated in the pocket 65. As shown in FIGS. 9 and 10, the side pocket 65 is provided with bilateral side walls 65b and 65c having inner surfaces on which supply terminals 66a and 66b each having a semi-spherical shape are formed. The side pocket 65 is further provided with a front, lower side as viewed in FIG. 7, wall 65d having an inner surface on which a bilateral pair of guide rails 67a and 67b are formed so as to vertically, as viewed, project for supporting and guiding the franged portions 15a and 15b of the oblate fluorescent lamp 11 with the outward flanged portions 15a and 15b being inserted into the guide grooves formed by the respective guide rails 67a and 67b, thus smoothly inserting and accommodating the oblate fluorescent lamp 11 in the side pocket 65, i.e. the holding unit 61.

A lighting unit 68 is mounted on the outer surface of the front wall 65d of the side pocket 65 as shown in FIG. 7. The lighting unit 68 is equipped with a lighting circuit parts 70 on one surface of a substrate 69 of a thin rectangular plate on which a lighting circuit pattern is formed, and a bilateral pair of electric terminals, not shown, are electrically connected to the supply terminals 66a and 66b through a bilateral pair of lead wires 71a and 71b.

According to this third embodiment, the liquid crystal display panel 30 can be stably held by the holding casing 62 by inserting the display panel 30 from the upper opening of the rectangularly cylindrical portion of the casing 62 as shown in FIG. 8. The oblate fluorescent lamp 11 can be also accommodated in the side pocket 65 of the casing 62 by inserting the same from the upper opening 65a thereof. In this accommodated state, the paired metal caps 13a and 13b of the fluorescent lamp 11 can be axially supported in a clamped manner by the supply terminals 66a and 66b as shown in FIG. 7, whereby the fluorescent lamp 11 is electrically connected to the lighting unit 68 through the supply terminals 66a and 66b and the lead wires 71a and 71b.

With this third embodiment, the oblate fluorescent lamp 11 and liquid crystal display panel 30 may be integrally assembled and, hence, according to this embodiment, the assembling process can be also simplified.

In the foregoing embodiments, there were described flat elongated cylindrical type oblate fluorescent lamps to be assembled in the liquid crystal display apparatus, but an oblate cylindrical type flat fluorescent lamp may be utilized without any problem.

In this modification of the flat fluorescent lamp, a front plate made of a transparent glass and a rear plate made of a plate glass having substantially the same size as that of the transparent front plate are sealed to upper and lower open ends of a glass spacer constituting a rectangular frame of the lamp to thereby form an oblate cylindrical glass bulb. A fluorescent substance is coated on the entire inner surface of the front plate, thus forming a fluorescent surface. At least one pair of electrodes and mercury and rare gas are enclosed in the glass bulb and a plurality of electro-conductive materials electrically connected to the paired electrodes are air-tightly extended outward of the glass bulb, and the extended ends are secured to the outer surface of the glass bulb as a pair of receiving terminals whereby a surface discharge is carried out between the electrodes and the fluorescent lamp is lightened.

Accordingly, with this modification, the present invention can attain substantially the same effects or advantages as those described with reference to the former embodiments when such flat type fluorescent lamp is assembled with the liquid crystal display panel and the lighting unit by means of the holding unit.

It is to be understood that the present invention is not limited to the described embodiments and many other changes and modifications may be made without departing from the scopes of the appended claims.

What is claimed is:

1. A liquid crystal display apparatus, which comprises:
    a liquid crystal display panel;
    a fluorescent lamp for illuminating said liquid crystal display panel, said fluorescent lamp being provided with a glass bulb in which at least a pair of electrodes are disposed and filled with mercury and gas, said glass bulb having an inner surface on which a fluorescent material is applied and said fluorescent lamp being further provided with a pair of receiving terminals;
    a lighting unit for lighting said fluorescent lamp, said lighting unit being electrically connected to a pair of supply terminals; and
    a holding unit for holding said liquid crystal display panel, detachably holding said fluorescent lamp and holding said lighting unit in an assembled state in which said paired receiving terminals are supported by said paired supply terminals;
    wherein said lighting unit comprises a substrate of thin rectangular plate-like structure, a lighting circuit element is mounted on one surface of said substrate and a pair of recesses are formed on bilateral edge portions of one surface of the substrate and wherein said holding unit comprises a holding plate of a rectangular plate-like structure having a window disposed at substantially a central portion thereof and a bilateral pair of pawl members which engage with said recesses when said lighting unit is assembled with said holding unit, said pawl members being disposed on one surface of said holding plate at bilateral edge portions of the window, each of said engaging pawl members having an L-shaped structure having a vertical portion projecting from the one surface of the holding plate and a horizontal portion inwardly horizontally extending from a front end of the vertical portion, and said horizontal portion having a front end projecting inwardly towards said window.

2. A liquid crystal display apparatus according to claim 1, wherein said front end projections are engaged with the recesses of said substrate, respectively, when the lighting unit is assembled with the holding unit.

3. A liquid crystal display apparatus according to claim 1, wherein the receiving terminals are composed of a pair of metal caps closing bilateral end portions of said glass bulb of the fluorescent lamp and the supply terminals are disposed on inner surface of the vertical portions of said engaging pawl members so that said receiving and supply terminals are electrically connected to each other when said fluorescent lamp is assembled with said holding unit.

4. A liquid crystal display apparatus according to claim 1, which comprises a support member disposed on a surface of the holding plate at a portion slightly lower than a lower edge portion of the window so as to support a bottom portion of said substrate.

5. A liquid crystal display apparatus according to claim 1, a bilateral pair of supporting pawl members are formed on another surface of said holding plate for holding said liquid crystal display panel when the liquid crystal display panel is assembled with said holding unit, each of said supporting pawl members having an L-shaped structure having a vertical portion projecting from another surface of the holding plate and a horizontal portion inwardly horizontally extending from a front end of the vertical portion, said horizontal portion having a front end projecting inwardly.

* * * * *